US012725931B2

(12) United States Patent
Tezuka et al.

(10) Patent No.: US 12,725,931 B2
(45) Date of Patent: Sep. 1, 2026

(54) ANTENNA MODULE

(71) Applicant: TDK CORPORATION, Tokyo (JP)

(72) Inventors: Kenichi Tezuka, Tokyo (JP); Aozora Kawasaki, Tokyo (JP); Shin Takane, Tokyo (JP); Yousuke Futamata, Tokyo (JP); Yasufumi Fukasawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 316 days.

(21) Appl. No.: 18/493,490

(22) Filed: Oct. 24, 2023

(65) Prior Publication Data

US 2024/0136719 A1 Apr. 25, 2024
US 2024/0235033 A9 Jul. 11, 2024

(30) Foreign Application Priority Data

Oct. 25, 2022 (JP) ................................ 2022-170676

(51) Int. Cl.
*H01Q 1/38* (2006.01)
*H01Q 1/42* (2006.01)
*H01Q 9/04* (2006.01)

(52) U.S. Cl.
CPC ............... *H01Q 9/045* (2013.01); *H01Q 1/38* (2013.01); *H01Q 1/422* (2013.01)

(58) Field of Classification Search
CPC .......... H01Q 9/045; H01Q 1/38; H01Q 1/422; H01Q 1/523; H01Q 9/0457; H01Q 1/2283; H01Q 9/0414; H01Q 21/08; H01Q 21/24; H01Q 1/48
See application file for complete search history.

(56) References Cited

U.S. PATENT DOCUMENTS

2019/0221937 A1 7/2019 Onaka et al.
2020/0161767 A1* 5/2020 Hara .................... H01Q 9/0414
2023/0036907 A1* 2/2023 Okuda ..................... H01Q 1/40

FOREIGN PATENT DOCUMENTS

WO 2018/074377 A1 4/2018

* cited by examiner

*Primary Examiner* — David E Lotter
(74) *Attorney, Agent, or Firm* — Oliff PLC

(57) ABSTRACT

An antenna module is an antenna module including at least a first radiation electrode, and a first power feeding electrode coupled with the first radiation electrode, and includes: a first dielectric layer including the first power feeding electrode; and a second dielectric layer disposed at one side of the first dielectric layer in a thickness direction of the first power feeding electrode, and a fracture toughness value of the second dielectric layer is larger than a fracture toughness value of the first dielectric layer.

19 Claims, 9 Drawing Sheets

Fig.8

| | DIELECTRIC LAYER 3, 4 | DIELECTRIC LAYER 2 | REMARKS |
|---|---|---|---|
| PERMITTIVITY | 9 | 4 | |
| RIGIDITY (YOUNG'S MODULUS) (GPa) | 185 | 54.6 | JIS R1602 |
| FRACTURE TOUGHNESS VALUE(MPa·($m^{1/2}$)) | 3.25 | 1.7 | JIS R1607 |

ANTENNA MODULE

CROSS REFERENCE TO RELATED APPLICATIONS

This application claims priority to Japanese Patent Application No. 2022-170676 filed on Oct. 25, 2022, the entire contents of which are incorporated by reference herein.

TECHNICAL FIELD

The present disclosure relates to an antenna module.

BACKGROUND

Conventionally, as antenna modules, an antenna module described in International Publication WO 2018/074377 A is known. This antenna module includes a dielectric layer provided with power feeding electrodes, and a dielectric layer provided with another circuit (high-pass filter circuit).

SUMMARY

An antenna module according to one aspect of the present disclosure is an antenna module including at least a first radiation electrode, and a first power feeding electrode coupled with the first radiation electrode, and includes: a first dielectric layer including the first power feeding electrode; and a second dielectric layer disposed at one side of the first dielectric layer in a thickness direction of the first power feeding electrode, and a fracture toughness value of the second dielectric layer is larger than a fracture toughness value of the first dielectric layer.

BRIEF DESCRIPTION OF THE DRAWINGS

FIG. 8 is a table illustrating characteristics of a dielectric used for each dielectric layer.

DETAILED DESCRIPTION

Here, the above-described antenna module causes a problem that, when chipping or the like occurs in the dielectric layer, an external appearance is impaired.

It is therefore an object of the present disclosure to provide an antenna module that has a good external appearance.

According to one aspect of the present disclosure, it is possible to provide an antenna module that has a good external appearance.

Hereinafter, some embodiment of the present disclosure will be described in detail. In this regard, the present disclosure is not limited to the following embodiment.

Figure 1:
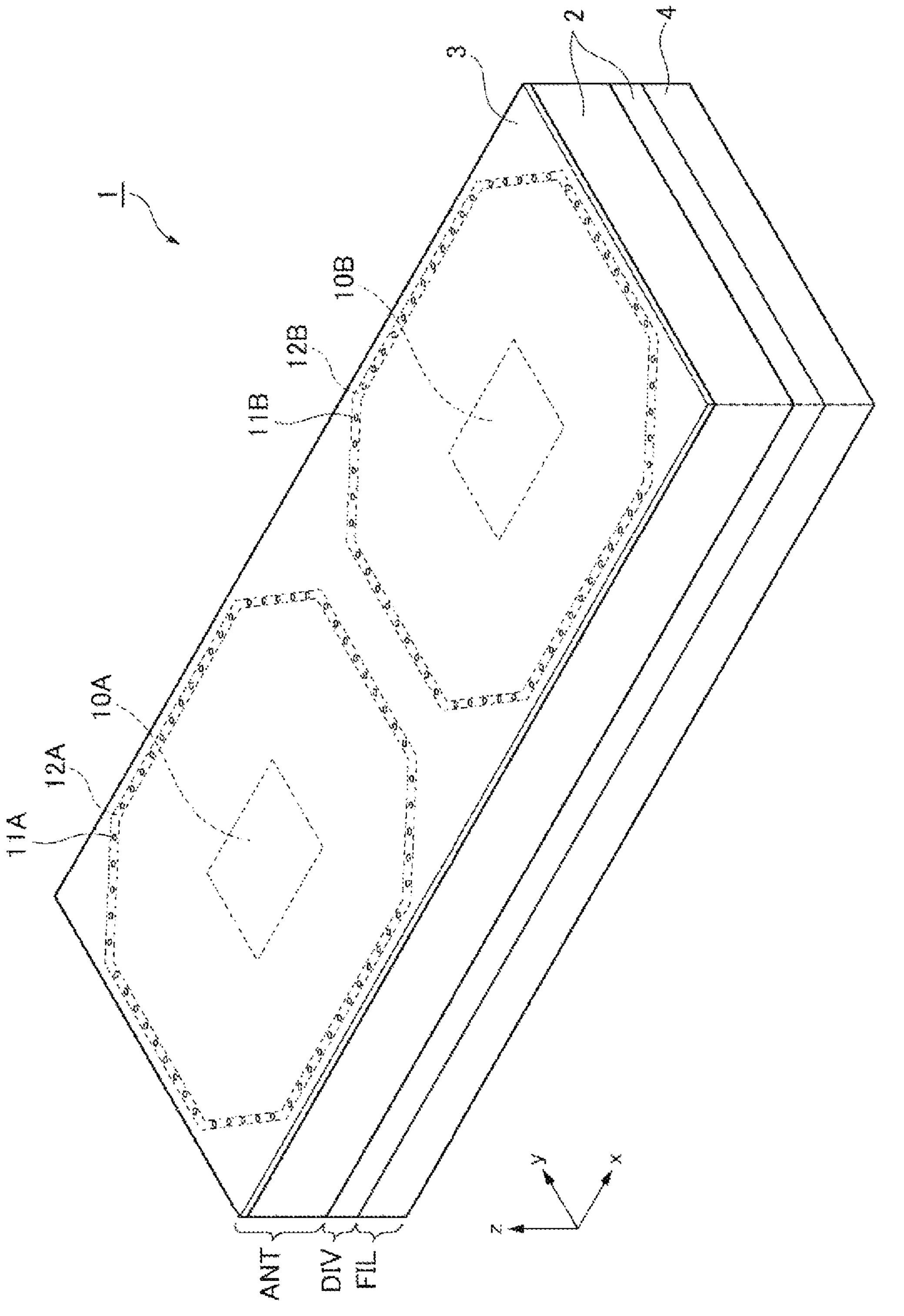
FIG. 1 is a schematic perspective view illustrating an external appearance of an antenna module according to an embodiment of the present disclosure.
Figure 2:
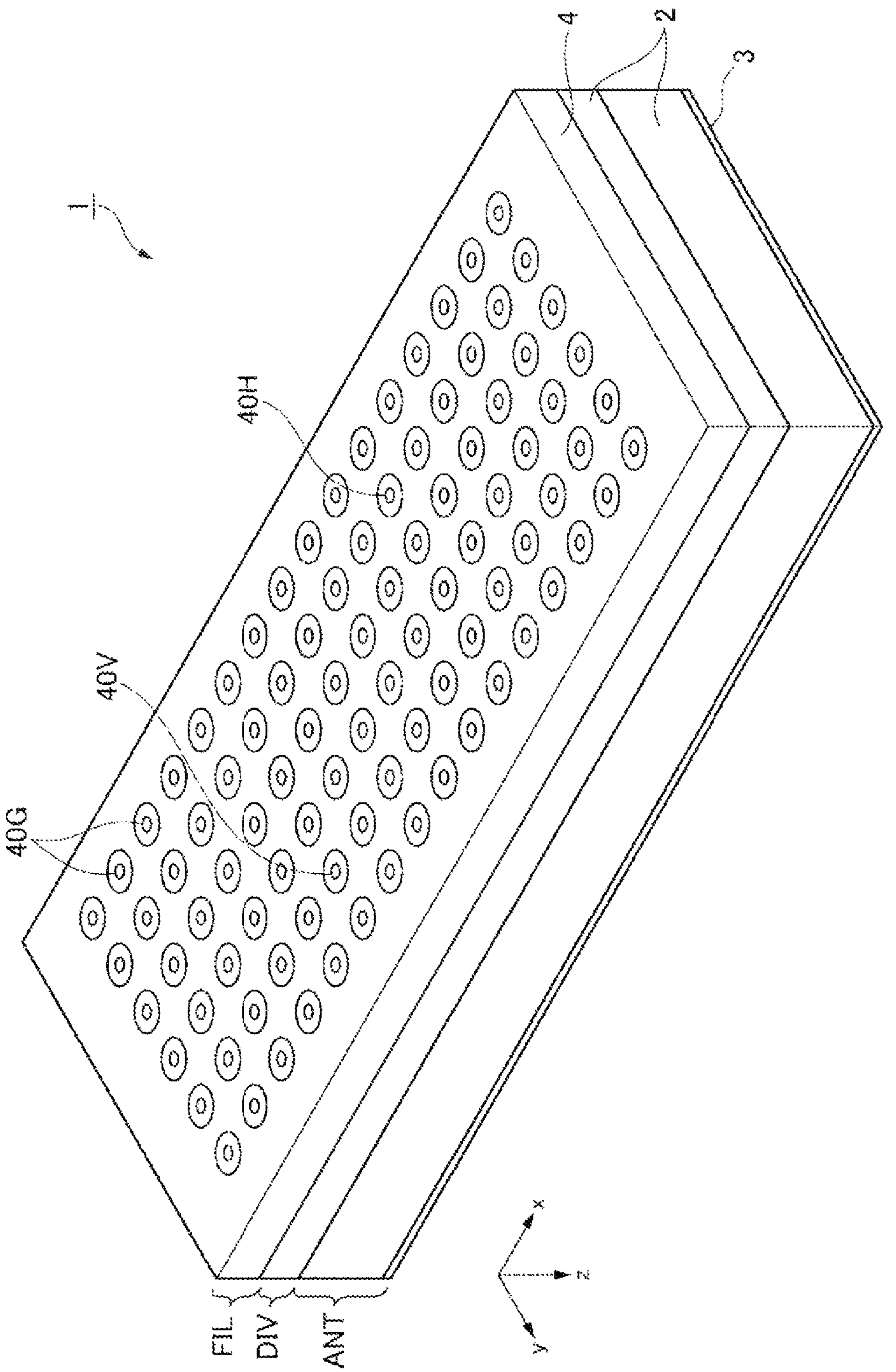
FIG. 2 is a schematic perspective view illustrating the external appearance of the antenna module according to the embodiment of the present disclosure.
Figure 3:
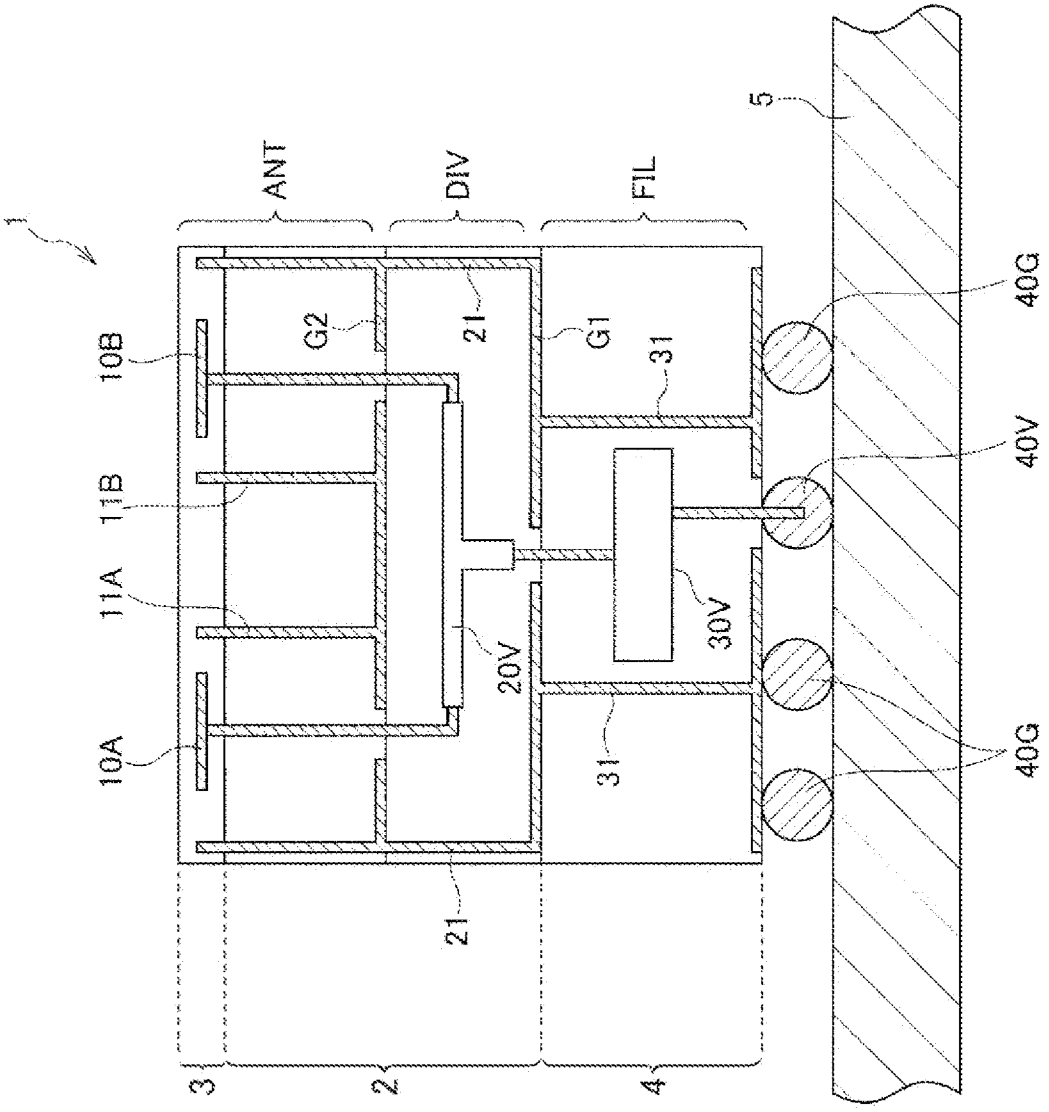
FIG. 3 is a schematic view for describing an internal structure of the antenna module according to the present embodiment.
Figure 4:
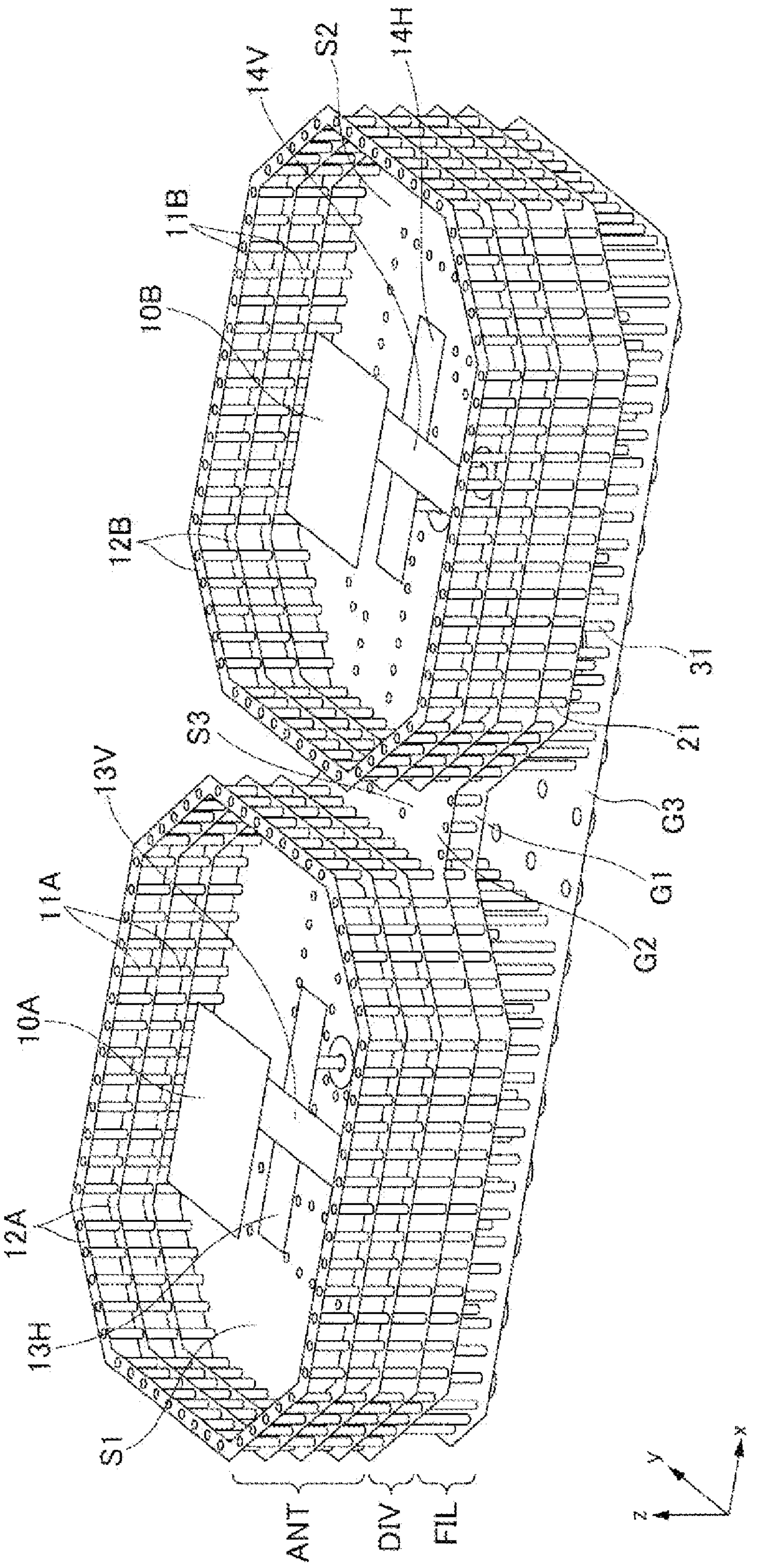
FIG. 4 is a schematic perspective view illustrating a state where dielectric layers are removed from the antenna module.

FIG. 1 is a schematic perspective view illustrating an external appearance of an antenna module 1 according to the embodiment of the present disclosure, and illustrates a state seen from a radiation surface side. FIG. 2 is a schematic perspective view illustrating the external appearance of the antenna module 1 according to the embodiment of the present disclosure, and illustrates a state seen from a mounting surface side. FIG. 3 is a schematic view for describing an internal structure of the antenna module 1, and schematically illustrates a state where the antenna module 1 is mounted on a motherboard 5. FIG. 4 is a schematic perspective view illustrating a state where dielectric layers 2 to 4 are removed from the antenna module 1.

Hereinafter, the embodiment of the present disclosure will be described in detail with reference to the accompanying drawings.

FIGS. 1 and 2 are the schematic perspective views illustrating the external appearance of the antenna module 1 according to the embodiment of the present disclosure, FIG. 1 illustrates the state seen from the radiation surface side, and FIG. 2 illustrates the state seen from the mounting surface side.

As illustrated in FIGS. 1 and 2, the antenna module 1 according to the present embodiment includes an antenna layer ANT, a filter layer FIL, and a distribution layer DIV laminated between the filter layer FIL and the antenna layer ANT.

The antenna layer ANT includes the dielectric layers 2 and 3, and a radiation electrode 10A (first radiation electrode) and a radiation electrode 10B (second radiation electrode) buried in the dielectric layer 3. In the present embodiment, the radiation electrodes 10A and 10B are disposed in the dielectric layer 3. Furthermore, in plan view seen from a lamination direction (z direction), the antenna layer ANT includes a plurality of ground conductors 11A that surround the radiation electrode 10A, and a plurality of ground conductors 11B that surround the radiation electrode 10B. The ground conductors 11A and 11B are columnar conductors that extend in the z direction so as to penetrate the dielectric layer 2. The plurality of ground conductors 11A are connected to a ring-shaped ground ring 12A on a predetermined xy plane, and the plurality of ground conductors 11B are connected to a ring-shaped ground ring 12B on the predetermined xy plane. Power feeding electrodes to be described later are provided in a space surrounded by the plurality of ground conductors 11A and 11B. In this way, the ground conductors 11A are disposed around the radiation electrode 10A and power feeding electrodes 13V and 13H. The ground conductors 11B are disposed around the radiation electrode 10B and power feeding electrodes 14V and 14H. End parts on a positive side in the z direction of the plurality of ground conductors 11A and 11B are covered with the dielectric layer 3.

The distribution layer DIV includes the dielectric layer 2 and a conductor pattern buried in the dielectric layer 2. The filter layer FIL includes the dielectric layer 4, and a conductor pattern that is buried in the dielectric layer 4. Details of the filter layer FIL and the distribution layer DIV will be described later. The filter layer FIL constitutes a mounting surface for the motherboard. Signal terminals 40V and 40H and a plurality of ground terminals 40G are provided on the mounting surface. The signal terminal 40V is a terminal for inputting/outputting a vertical polarization antenna signal, and the signal terminal 40H is a terminal for inputting/outputting a horizontal polarization antenna signal. A ground potential is applied to the ground terminals 40G.

FIG. 3 is the schematic view for describing the internal structure of the antenna module 1 according to the present embodiment, and schematically illustrates a state where the antenna module 1 is mounted on the motherboard 5.

As illustrated in FIG. 3, a ground electrode G1 is provided between the filter layer FIL and the distribution layer DIV, and a ground electrode G2 is provided between the distribution layer DIV and the antenna layer ANT. The ground electrode G1 is buried in the dielectric layer 4. The ground electrode G2 is provided at an interface between the dielectric layer 4 and the dielectric layer 2.

The filter layer FIL is provided with a filter circuit pattern 30V. The filter circuit pattern 30V is a band-pass filter, and is connected to the signal terminal 40V. The filter circuit pattern 30V is surrounded by a plurality of ground conductors 31 in plan view seen from the lamination direction. The ground conductor 31 is a columnar conductor that extends in the z direction so as to penetrate the dielectric layer 4. Although not illustrated in FIG. 3, the filter layer FIL also includes another filter circuit pattern that is connected to the signal terminal 40H.

The distribution layer DIV is provided with a distribution circuit pattern 20V. The distribution circuit pattern 20V is a circuit that distributes to the radiation electrodes 10A and 10B an antenna signal fed from the filter circuit pattern 30V. The distribution circuit pattern 20V is surrounded by a plurality of ground conductors 21 in plan view seen from the lamination direction. The ground conductor 21 is a columnar conductor that extends in the z direction so as to penetrate the dielectric layer 2. Although not illustrated in FIG. 3, the distribution layer DIV also includes another distribution circuit pattern that is connected to another filter circuit pattern. The dielectric layer 2 includes a distribution circuit pattern 20V between the power feeding electrodes 13V and 13H and the power feeding electrodes 14V and 14H described later, and the dielectric layer 4.

FIG. 4 is the schematic perspective view illustrating a state where the dielectric layers 2 to 4 are removed from the antenna module 1.

As illustrated in FIG. 4, the power feeding electrodes 13V and 13H (first power feeding electrodes) that overlap the radiation electrode 10A seen from the z direction are provided in a space surrounded by the plurality of ground conductors 11A. The power feeding electrodes 13V and 13H are coupled with the radiation electrode 10A. The dielectric layer 2 includes the power feeding electrodes 13V and 13H. Among these electrodes, the power feeding electrode 13V is a conductor pattern whose longitudinal direction is a y direction, and supplies a vertical polarization antenna signal SV to the radiation electrode 10A. On the other hand, the power feeding electrode 13H is a conductor pattern whose longitudinal direction is an x direction, and supplies a horizontal polarization antenna signal SH to the radiation electrode 10A. The power feeding electrodes 13V and 13H are located close to one end part of the conductor patterns, and receive supply of the antenna signals via the filter circuit pattern 30V and the distribution circuit pattern 20V (see FIG. 3). Hence, a power feeding position of the power feeding electrode 13V for the radiation electrode 10A differs from a power feeding position of the power feeding electrode 13H for the radiation electrode 10A by 90°.

Similarly, the power feeding electrodes 14V and 14H (second power feeding electrodes) that overlap the radiation electrode 10B seen from the z direction are provided in a space surrounded by the plurality of ground conductors 11B. The power feeding electrodes 14V and 14H are coupled with the radiation electrode 10B. The dielectric layer 2 includes the power feeding electrodes 14V and 14H. Among these electrodes, the power feeding electrode 14V is a conductor pattern whose longitudinal direction is the y direction, and supplies the vertical polarization antenna signal SV to the radiation electrode 10B. On the other hand, the power feeding electrode 14H is a conductor pattern whose longitudinal direction is the x direction, and supplies the horizontal polarization antenna signal SH to the radiation electrode 10B. The power feeding electrodes 14V and 14H are located at positions close to one end parts of the conductor patterns, and receive supply of the antenna signals via the filter circuit pattern 30 and the distribution circuit pattern 20V (see FIG. 3). Hence, a power feeding position of the power feeding electrode 14V for the radiation electrode 10B differs from a power feeding position of the power feeding electrode 14H for the radiation electrode 10B by 90°.

Ground electrodes G1 to G3 of large areas are provided below the antenna layer ANT. The ground electrodes G1 to G3 are disposed at a negative side in the z direction with respect to the power feeding electrodes 13V and 13H and the power feeding electrodes 14V and 14H. A region sandwiched between the ground electrode G1 and the ground electrode G2 is the distribution layer DIV. The ground electrode G1 and the ground electrode G2 are connected by the plurality of ground conductors 21. Here, in plan view seen from the z direction, each of the ground electrodes G1 and G2 includes a region S1 that overlaps a space surrounded by the plurality of ground conductors 11A, a region S2 that overlaps a space surrounded by the plurality of ground conductors 11B, and a region S3 that connects the region S1 and the region S2. Furthermore, the width in the y direction of the region S3 is narrower than the widths in the y direction of the regions S1 and S2. Consequently, mutual interference between the radiation electrodes 10A and 10B via the ground electrodes G1 and G2 is reduced, so that it is possible to enhance independence of the radiation electrode 10A and the radiation electrode 10B.

A region sandwiched between the ground electrode G1 and the ground electrode G3 is the filter layer FIL. The ground electrode G1 and the ground electrode G3 are connected by the plurality of ground conductors 31. The width in the y direction of the ground electrode G3 may be fixed.

Figure 5A:
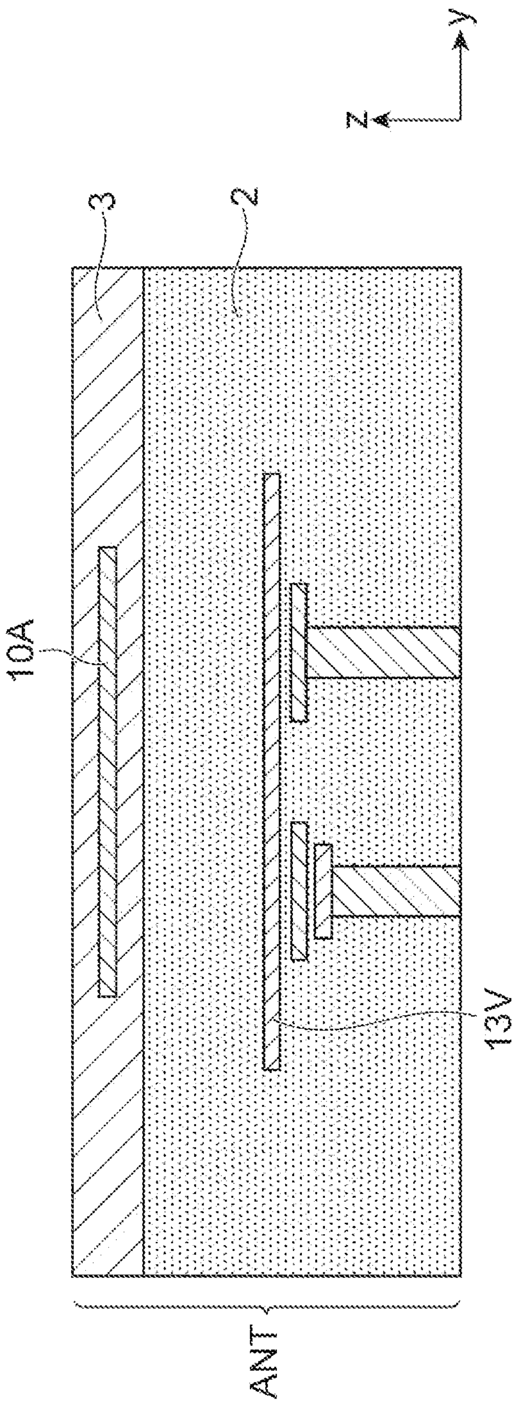
FIGS. 5A and 5B are cross-sectional views each illustrating state in the vicinity of a radiation electrode and a power feeding electrode.
Figure 5B:
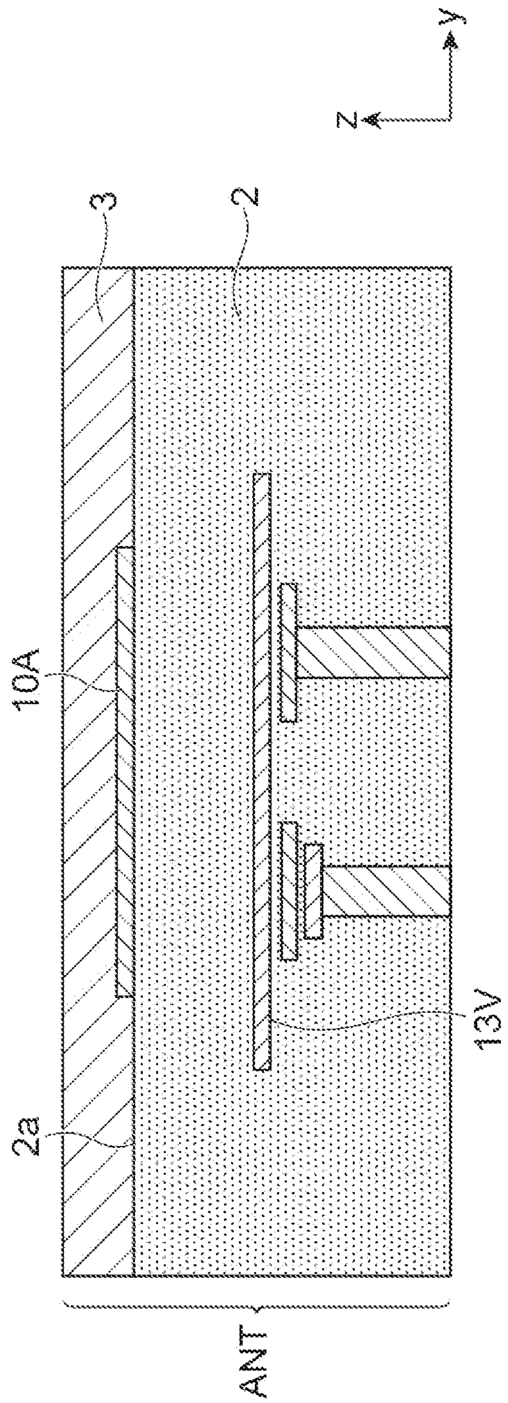

The position of the radiation electrode 10A in the dielectric layer 3 will be described with reference to FIGS. 5A and 5B. As illustrated in FIG. 5A, the radiation electrode 10A is disposed in the dielectric layer 3. At this time, the dielectric layer 3 adopts a layer structure of two or more layers. Furthermore, as illustrated in FIG. 5B, the radiation electrode 10A may be disposed on a principal surface 2*a* on a positive side in the z direction of the dielectric layer 2.

Figure 6A:
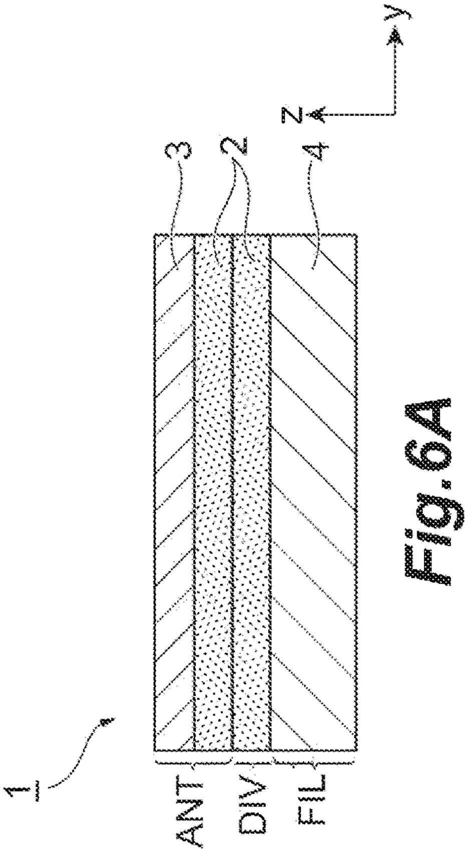
FIGS. 6A to 6C are schematic cross-sectional views each illustrating layer configuration of the dielectric layers.

Next, the dielectric layers 2, 3, and 4 will be described with reference to FIG. 6A. The dielectric layer 3 is disposed at the positive side in the z direction of the dielectric layer 2. The dielectric layer 4 is disposed at the negative side in the z direction of the dielectric layer 4. Part of the dielectric layer 2 and the dielectric layer 3 constitute the antenna layer ANT. The other part of the dielectric layer 2 constitutes the distribution layer DIV. The dielectric layer 4 constitutes the filter layer FIL. In the present embodiment, the dielectric layer 2 is an example of a "first dielectric layer" in the claims, the dielectric layer 3 is an example of a "second dielectric layer" in the claims, and the dielectric layer 4 is an example of a "third dielectric layer" in the claims. Furthermore, the positive side in the z direction is an example of "one side in a thickness direction of a power feeding electrode" in the claims, and the negative side in the z direction is an example of "an other side in the thickness direction of the power feeding electrode" in the claims.

A dielectric material that forms the dielectric layer 4 may have a higher permittivity than that of a dielectric material that forms the dielectric layer 2. A dielectric material that forms the dielectric layer 3 may be the same as a dielectric material that forms the dielectric layer 4.

A fracture toughness value of the dielectric layer 3 is larger than a fracture toughness value of the dielectric layer 2. Furthermore, a fracture toughness value of the dielectric layer 4 is larger than the fracture toughness value of the dielectric layer 2. Fracture toughness refers to characteristics indicating how much a material can resist when cracks are produced in the material and develop. Fracture toughness is generally regarded as toughness. A method for measuring a fracture toughness value of fine ceramic is defined in "JIS R 1607". The fracture toughness value of the dielectric layer 2 may be in the range of 0.5 to 2.5. The fracture toughness values of the dielectric layers 3 and 4 may be 1.5 times to 2.5 times larger than the fracture toughness value of the dielectric layer 2. Note that, although the fracture toughness value may be obtained by directly measuring a product of the antenna module 1, the fracture toughness value may be obtained by making a dielectric layer for measurement based on a composition obtained by analyzing components of the dielectric layer, and measuring the made dielectric layer instead of directly measuring a product depending on a product size.

The Young's modulus of the dielectric layer 3 is larger than the Young's modulus of the dielectric layer 2. Furthermore, the Young's modulus of the dielectric layer 4 is larger than the Young's modulus of the dielectric layer 2. The "Hooke's law" according to material mechanics determines that there is a proportional relationship between stress and strain, and a relational expression of "$\sigma=E\varepsilon$" holds when the Young's modulus is E, normal stress is $\sigma$, and normal strain is $\varepsilon$. A large Young's modulus indicates that rigidity is high (deformation hardly occurs) and machining accuracy improves. The Young's modulus of the dielectric layer 2 may be in the range of 30 to 80. The Young's moduli of the dielectric layers 3 and 4 may be 1.5 times to 4 times larger than the Young's modulus of the dielectric layer 2.

A ceramic material is adopted as a material of the dielectric layers 2, 3, and 4. The dielectric layers 2, 3, and 4 may be made of Low-Temperature Fired Ceramic (LTCC). As a method of increasing the fracture toughness value of the dielectric layer, there are a method for reducing pores in a ceramic material used for the dielectric layer and increasing the density, a method for using for a dielectric layer a ceramic material whose particle shape is a plate-like shape or a columnar shape, a method for increasing the Young's modulus of a ceramic material used for a dielectric layer, and the like. An example of a method includes reducing pores of the ceramic material used for the dielectric layers 3 and 4 compared to pores of the ceramic material used for the dielectric layer 2 and increasing the density. Consequently, it is possible to make the fracture toughness values of the dielectric layers 3 and 4 larger than the fracture toughness value of the dielectric layer 2. Furthermore, the method for reducing pores in a ceramic material used for a dielectric layer and increasing the density, and the method for using for a dielectric layer a ceramic material whose particle shape is a plate-like shape or a columnar shape can increase the Young's modulus of the dielectric layer.

Figure 6B:
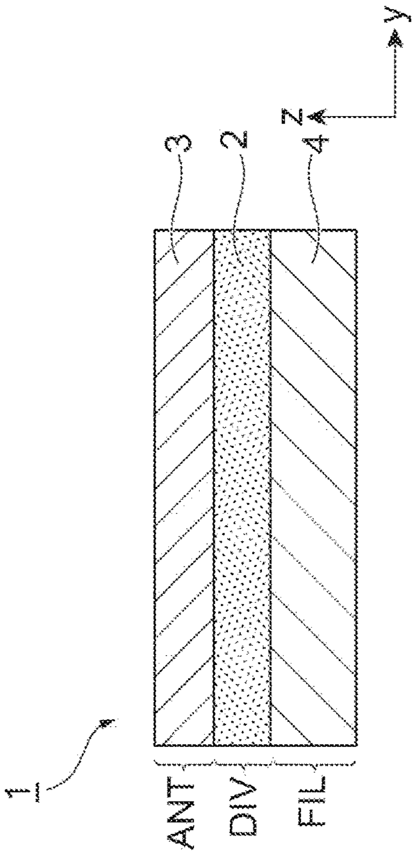

The layer configuration of the antenna module 1 is not particularly limited, and a configuration illustrated in FIG. 6B may be adopted. In the antenna module 1 illustrated in FIG. 6B, the dielectric layer 3 constitutes the antenna layer ANT. The dielectric layer 2 constitutes the distribution layer DIV. The dielectric layer 4 constitutes the filter layer FIL.

Figure 6C:
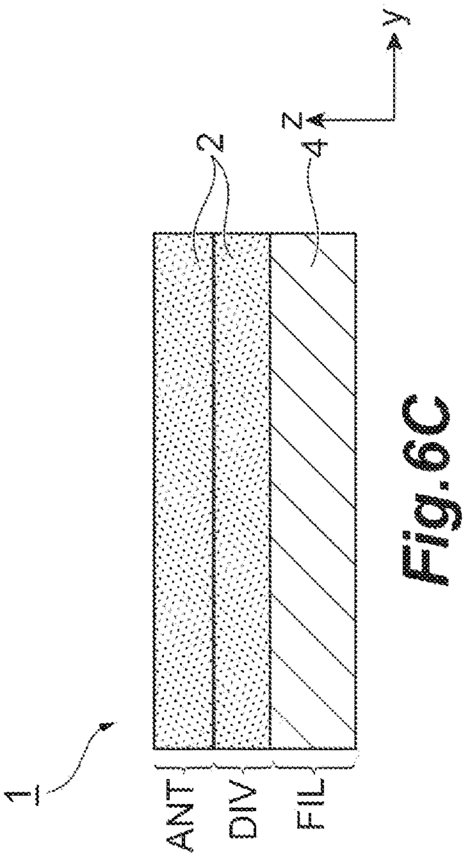
Figure 7B:
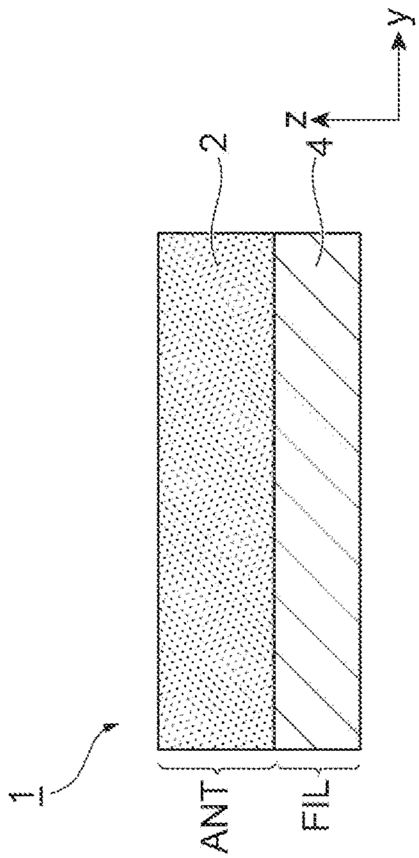
FIGS. 7A to 7C are schematic cross-sectional views each illustrating the layer configuration of the dielectric layers.

The dielectric layers of the antenna module 1 may include two types of layers. For example, a configuration illustrated in FIG. 6C may be adopted. In the antenna module 1 illustrated in FIG. 6C, the dielectric layer 2 constitutes the antenna layer ANT. The dielectric layer 2 constitutes the distribution layer DIV. The dielectric layer 4 constitutes the filter layer FIL. In this case, the dielectric layer 2 is an example of a "first dielectric layer" in the claims, and the dielectric layer 4 is an example of a "second dielectric layer" in the claims. Furthermore, the negative side in the z direction is an example of "one side in a thickness direction of a power feeding electrode" in the claims, and the positive side in the z direction is an example of "an other side in the thickness direction of the power feeding electrode" in the claims. This relationship also holds in the antenna module 1 of FIG. 7B described later.

Figure 7A:
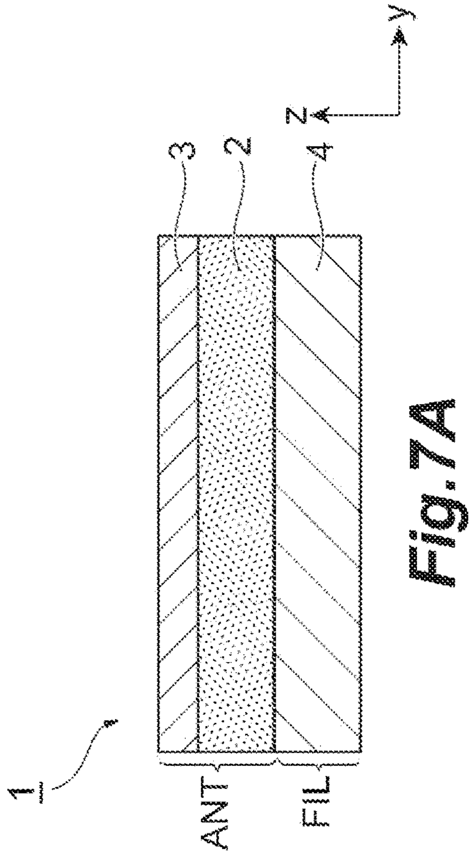

In the antenna module 1, the distribution layer DIV may be omitted. The antenna module 1 may adopt, for example, configurations illustrated in FIGS. 7A and 7B. In the antenna module 1 illustrated in FIG. 7A, the dielectric layer 3 and the dielectric layer 2 constitute the antenna layer ANT. The dielectric layer 4 constitutes the filter layer FIL. In the antenna module 1 illustrated in FIG. 7B, the dielectric layer 2 constitutes the antenna layer ANT. The dielectric layer 4 constitutes the filter layer FIL.

Figure 7C:
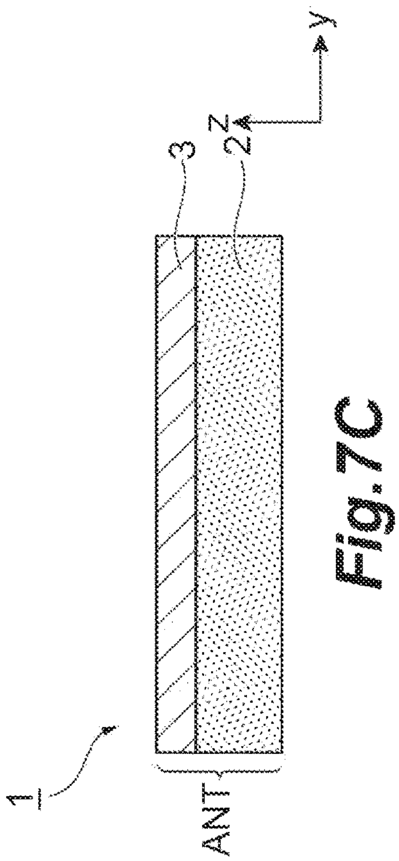

In the antenna module 1, the distribution layer DIV and the filter layer FIL may be omitted. The antenna module 1 may adopt, for example, a configuration illustrated in FIG. 7C. In the antenna module 1 illustrated in FIG. 7C, the dielectric layer 3 and the dielectric layer 2 constitute the antenna layer ANT. As described above, the "antenna module" in this description also includes a product including only the antenna layer ANT.

Next, functions and effects of the antenna module 1 according to the present embodiment will be described.

The antenna module 1 is the antenna module 1 that includes at least the radiation electrode 10A and the power feeding electrodes 13H and 13V that are coupled with radiation electrode 10A, and includes the dielectric layer 2 that includes the power feeding electrodes 13H and 13V, and the dielectric layer 3 (or the dielectric layer 4) that is disposed at the one side of the dielectric layer 2 in the thickness direction of the power feeding electrodes 13H and 13V, and the fracture toughness value of the dielectric layer 3 (or the dielectric layer 4) is larger than the fracture toughness value of the dielectric layer 2.

According to this antenna module 1, the dielectric layer 3 (or the dielectric layer 4) having the high fracture toughness value can be disposed on an outer layer side of the dielectric layer 2 including the power feeding electrodes 13H and 13V. A material having a high fracture toughness value is a material in which a crack hardly develops. Consequently, a dielectric layer in which chipping or the like hardly occurs can be disposed on the outer layer side of the antenna module 1. Consequently, it is possible to prevent chipping or the like, and make the external appearance of the antenna module good.

The Young's modulus of the dielectric layer 3 (or the dielectric layer 4) may be larger than the Young's modulus of the dielectric layer 2. A material having a high Young's modulus has high rigidity and hardly deforms, and therefore is a material whose machining accuracy is good. Consequently, a dielectric layer whose machining accuracy is good and in which chipping or the like hardly occurs can be disposed on the outer layer side of the antenna module 1. Consequently, it is possible to prevent chipping or the like, and make the external appearance of the antenna module good.

The antenna module 1 may further include the ground electrodes G1, G2, and G3 that are disposed at the other side in the thickness direction with respect to the power feeding electrodes 13H and 13V. In this case, it is possible to dispose the dielectric layer 3 having the high fracture toughness value with respect to the dielectric layer 2 on the opposite side of the ground electrodes G1, G2, and G3, and prevent chipping or the like on the surface layer side of the antenna module 1 and make the external appearance of the antenna module 1 good.

The radiation electrode 10A may be disposed in the dielectric layer 3. In this case, the radiation electrode 10A is disposed inside the dielectric layer 3 having the high fracture toughness value. Consequently, the radiation electrode 10A is disposed at a position close to the surface layer, so that it is possible to achieve high radiation efficiency.

The radiation electrode 10A may be disposed on the principal surface 2*a* on the one side of the dielectric layer 2 and be covered with the dielectric layer 3. In this case, the radiation electrode 10A on the principal surface 2*a* of the dielectric layer 2 can be covered with the dielectric layer 3 having the high fracture toughness value. Consequently, it is possible to sufficiently protect the radiation electrode 10A from an impact from an outside.

The antenna module 1 may further include the dielectric layer 4 disposed at the other side of the dielectric layer 2 in the thickness direction. In this case, the antenna module 1 can be provided with another circuit or the like on the side opposite to the dielectric layer 3.

The dielectric layer 4 may include the filter circuit pattern 30V. In this case, it is possible to reduce extra transmission paths, so that it is possible to reduce transmission loss of the antenna module 1.

The fracture toughness value of the dielectric layer 4 may be larger than the fracture toughness value of the dielectric layer 2. In this case, the dielectric layer 2 is sandwiched from both sides by the dielectric layers 3 and 4 having the high fracture toughness values. Consequently, it is possible to make the external appearance of the both sides of the antenna module 1 good.

The Young's modulus of the dielectric layer 4 may be larger than the Young's modulus of the dielectric layer 2. In this case, it is possible to dispose on the outer layer side on the other side of the antenna module 1 a dielectric layer whose machining accuracy is good and in which chipping or the like hardly occurs.

The antenna module 1 may include the plurality of columnar ground conductors 11A disposed around the radiation electrode 10A and the power feeding electrodes 13H and 13V. In this case, in a case where antenna elements each including the radiation electrode 10A and the power feeding electrodes 13H and 13V are disposed in an array, it is possible to enhance isolation from other surrounding antenna elements.

End parts on the one side in the thickness direction of the plurality of ground conductors 11A may be covered with the dielectric layer 3. In this case, the dielectric layer 3 having the high fracture toughness value can cover the end parts of the ground conductors 11A.

The antenna module 1 may further include the radiation electrode 10B, and the power feeding electrodes 14H and 14V that are coupled with the radiation electrode 10B, and the dielectric layer 2 may include the power feeding electrodes 14H and 14V. In this case, the antenna module 1 can include two sets of the radiation electrodes and the power feeding electrodes.

The antenna module 1 may further include the dielectric layer 4 that is disposed at the other side of the dielectric layer 2 in the thickness direction, and the dielectric layer 2 may include the distribution circuit pattern 20V between the power feeding electrodes 13H and 13V and the power feeding electrodes 14H and 14V, and the dielectric layer 4. In this case, a plurality of antenna elements can be integrated with the antenna module 1, so that it is possible to simplify a connection structure between the antenna module 1 and an IC that supplies antenna signals.

The dielectric layer 3 and the dielectric layer 4 may be made of the same dielectric. In this case, it is possible to reduce the number of types of dielectrics to prepare for forming the plurality of dielectric layers.

The dielectric layer 2, the dielectric layer 3, and the dielectric layer 4 may be made of the low-temperature fired ceramic. In this case, it is possible to achieve low loss when the antenna module 1 is used in the millimeter wave band.

Figure 9B:
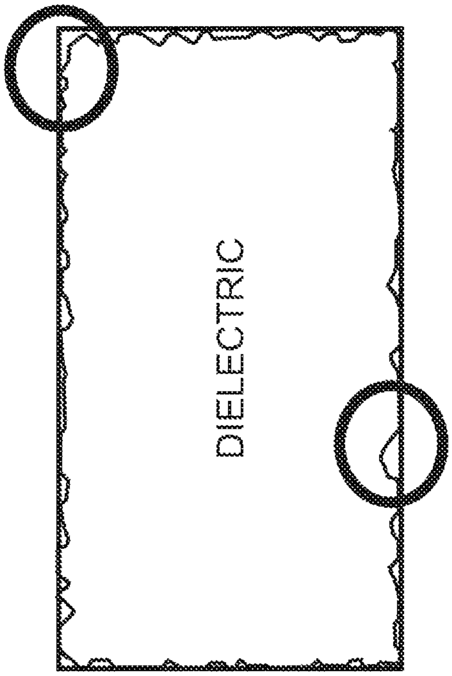
FIGS. 9A and 9B are views each illustrating state of chipping of the dielectric used for each dielectric layer.
Figure 9A:
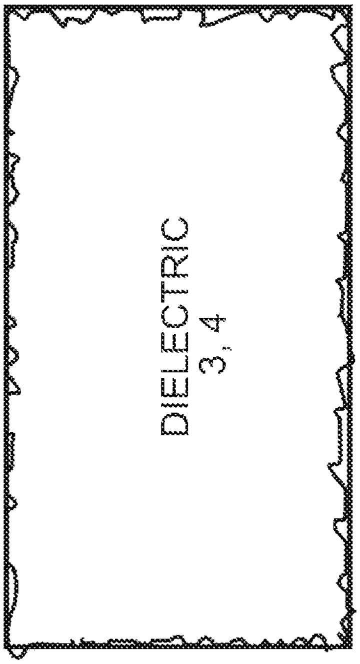

The fact that chipping hardly occurs in the dielectric layers 3 and 4 and the dielectric layer 2 will be described with reference to FIG. 8. As the "permittivity" in FIG. 8, relative permittivities of the dielectrics used for the dielectric layers 3 and 4 and the dielectric used for the dielectric layer 2 are indicated. As the "rigidity (Young's modulus)", the Young's moduli of the dielectrics used for the dielectric layers 3 and 4 and the dielectric used for the dielectric layer 2 are indicated. The Young's modulus is measured based on JIS R 1602. More specifically, the Young's modulus was measured by a static modulus test method. As the "fracture toughness value", the fracture toughness values of the dielectrics used for the dielectric layers 3 and 4 and the dielectric used for the dielectric layer 2 are indicated. The fracture toughness value is measured based on JIS R 1607. More specifically, the fracture toughness value was measured by a fracture toughness test method. FIG. 9A illustrates a state where chipping occurred at four end parts when the dielectrics used for the dielectric layers 3 and 4 were cut into rectangles. FIG. 9B illustrates a state where chipping occurred at the four end parts when the dielectrics used for the dielectric layers 3 and 4 were cut into rectangles. As indicated by encircled portions in FIG. 9B, large chippings were confirmed in the dielectric used for the dielectric layer 2. By contrast with this, it was confirmed as illustrated in FIG. 9A that it is possible to prevent chipping in the dielectrics used for the dielectric layers 3 and 4.

The present disclosure is not limited to the above-described embodiment.

For example, the shape and the arrangement of each conductor of the antenna module 1 illustrated in FIGS. 1 to 3 are merely examples, and may be changed as appropriate.

The technique according to the present disclosure includes the following configuration examples, yet is not limited thereto.

[Aspect 1]

An antenna module is an antenna module including at least a first radiation electrode, and a first power feeding electrode coupled with the first radiation electrode, and includes:

a first dielectric layer including the first power feeding electrode; and a second dielectric layer disposed on one side of the first dielectric layer in a thickness direction of the first power feeding electrode, and a fracture toughness value of the second dielectric layer is larger than a fracture toughness value of the first dielectric layer.

[Aspect 2]

According to the antenna module according to aspect 1, a Young's modulus of the second dielectric layer is larger than a Young's modulus of the first dielectric layer.

[Aspect 3]

The antenna module according to aspect 1 or 2 further includes a ground electrode disposed at an other side in the thickness direction with respect to the first power feeding electrode.

[Aspect 4]

According to the antenna module according to any one of aspects 1 to 3, the first radiation electrode is disposed in the second dielectric layer.

[Aspect 5]

According to the antenna module according to any one of aspects 1 to 4, the first radiation electrode is disposed on a principal surface on the one side of the first dielectric layer and is covered with the second dielectric layer.

[Aspect 6]

The antenna module according to any one of aspects 1 to 5 further includes a third dielectric layer disposed on an other side of the first dielectric layer in the thickness direction.

[Aspect 7]

According to the antenna module according to aspect 6, the third dielectric layer includes a filter circuit pattern.

[Aspect 8]

According to the antenna module according to aspect 6 or 7, a fracture toughness value of the third dielectric layer is larger than the fracture toughness value of the first dielectric layer.

[Aspect 9]

According to the antenna module according to any one of aspects 6 to 8, a Young's modulus of the third dielectric layer is larger than a Young's modulus of the first dielectric layer.

[Aspect 10]

The antenna module according to any one of aspects 1 to 9 further includes a plurality of columnar ground conductors disposed around the first radiation electrode and the first power feeding electrode.

[Aspect 11]

According to the antenna module according to aspect 10, end parts on the one side in the thickness direction of the plurality of ground conductors are covered with the second dielectric layer.

[Aspect 12]

The antenna module according to any one of aspects 1 to 11 further includes:

a second radiation electrode; and a second power feeding electrode coupled with the second radiation electrode, and the first dielectric layer includes the second power feeding electrode.

[Aspect 13]

The antenna module according to aspect 12 further includes a third dielectric layer disposed on the other side of the first dielectric layer in the thickness direction, and the first dielectric layer includes a distribution circuit pattern between the first power feeding electrode and the second power feeding electrode, and the third dielectric layer.

[Aspect 14]

According to the antenna module according to any one of aspects 6 to 8, the second dielectric layer and the third dielectric layer are made of a same dielectric.

[Aspect 15]

According to the antenna module according to any one of aspects 6 to 8, the first dielectric layer, the second dielectric layer, and the third dielectric layer are made of low-temperature fired ceramic.

REFERENCE SIGNS LIST

1 ANTENNA MODULE
2 DIELECTRIC LAYER (FIRST DIELECTRIC LAYER)
3 DIELECTRIC LAYER (SECOND DIELECTRIC LAYER)
4 DIELECTRIC LAYER (THIRD DIELECTRIC LAYER AND SECOND DIELECTRIC LAYER)
10A RADIATION ELECTRODE (FIRST RADIATION ELECTRODE)
10B RADIATION ELECTRODE (SECOND RADIATION ELECTRODE)
11A GROUND CONDUCTOR
13H, 13V POWER FEEDING ELECTRODE (FIRST POWER FEEDING ELECTRODE)
14H, 14V POWER FEEDING ELECTRODE (SECOND POWER FEEDING ELECTRODE)
20V DISTRIBUTION CIRCUIT PATTERN
30V FILTER CIRCUIT PATTERN
G1, G2, G3 GROUND ELECTRODE
DIV DISTRIBUTION LAYER
FIL FILTER LAYER

What is claimed is:

1. An antenna module including at least a first radiation electrode, and a first power feeding electrode coupled with the first radiation electrode, the antenna module comprising:

a first dielectric layer including the first power feeding electrode; and a second dielectric layer disposed at one side of the first dielectric layer in a thickness direction of the first power feeding electrode, wherein a fracture toughness value of the second dielectric layer is larger than a fracture toughness value of the first dielectric layer, and wherein the fracture toughness value of the second dielectric layer is 1.5 to 2.5 times that of the first dielectric layer.

2. The antenna module according to claim 1, wherein a Young's modulus of the second dielectric layer is larger than a Young's modulus of the first dielectric layer.

3. The antenna module according to claim 1, further comprising a ground electrode disposed at an other side in the thickness direction with respect to the first power feeding electrode.

4. The antenna module according to claim 1, wherein the first radiation electrode is disposed in the second dielectric layer.

5. The antenna module according to claim 1, wherein the first radiation electrode is disposed on a principal surface on the one side of the first dielectric layer and is covered with the second dielectric layer.

6. The antenna module according to claim 1, further comprising a third dielectric layer disposed at an other side of the first dielectric layer in the thickness direction.

7. The antenna module according to claim 6, wherein the third dielectric layer includes a filter circuit pattern.

8. The antenna module according to claim 6, wherein a fracture toughness value of the third dielectric layer is larger than the fracture toughness value of the first dielectric layer.

9. The antenna module according to claim 6, wherein a Young's modulus of the third dielectric layer is larger than a Young's modulus of the first dielectric layer.

10. The antenna module according to claim 1, further comprising a plurality of columnar ground conductors disposed around the first radiation electrode and the first power feeding electrode.

11. The antenna module according to claim 10, wherein end parts on the one side in the thickness direction of the plurality of ground conductors are covered with the second dielectric layer.

12. The antenna module according to claim 1, further comprising:

a second radiation electrode; and a second power feeding electrode coupled with the second radiation electrode, wherein the first dielectric layer includes the second power feeding electrode.

13. The antenna module according to claim 12, further comprising a third dielectric layer disposed at an other side of the first dielectric layer in the thickness direction, wherein the first dielectric layer includes a distribution circuit pattern between the first power feeding electrode and the second power feeding electrode, and the third dielectric layer.

14. The antenna module according to claim 6, wherein the second dielectric layer and the third dielectric layer are made of a same dielectric.

15. The antenna module according to claim 6, wherein the first dielectric layer, the second dielectric layer, and the third dielectric layer are made of low-temperature fired ceramic.

16. The antenna module according to claim 1, wherein a thickness of the second dielectric layer is smaller than a thickness of the first dielectric layer in the thickness direction.

17. The antenna module according to claim 1, wherein the first radiation electrode is disposed in the second dielectric layer.

18. The antenna module according to claim 17, wherein a thickness of the second dielectric layer is smaller than a thickness of the first dielectric layer in the thickness direction.

19. An antenna module including at least a first radiation electrode, and a first power feeding electrode coupled with the first radiation electrode, the antenna module comprising:

a first dielectric layer including the first power feeding electrode; and a second dielectric layer disposed at one side of the first dielectric layer in a thickness direction of the first power feeding electrode, wherein a fracture toughness value of the second dielectric layer is larger than a fracture toughness value of the first dielectric layer, wherein a thickness of the second dielectric layer is smaller than a thickness of the first dielectric layer in the thickness direction, and wherein the first radiation electrode is disposed in the second dielectric layer.

* * * * *